United States Patent [19]

Frisch et al.

[11] Patent Number: 5,060,310
[45] Date of Patent: Oct. 22, 1991

[54] APPARATUS AND METHOD FOR REDUCTION OF INTERMODULATION DISTORTION IN AN OPTICAL FIBER NETWORK

[75] Inventors: Arnold M. Frisch, Portland; Thomas A. Almy, Tualatin, both of Oreg.

[73] Assignee: Tektronix, Inc., Beaverton, Oreg.

[21] Appl. No.: 392,175

[22] Filed: Aug. 10, 1989

[51] Int. Cl.[5] .................. H04J 14/02; H04B 10/04
[52] U.S. Cl. ................................. 359/188; 359/124
[58] Field of Search ............... 455/609, 611, 613, 617, 455/618; 370/3

[56] References Cited

U.S. PATENT DOCUMENTS

| | | | |
|---|---|---|---|
| 4,009,385 | 2/1977 | Sell | 455/618 |
| 4,501,022 | 2/1985 | Oswald | 455/613 |
| 4,504,976 | 3/1985 | Beaudet | 455/618 |
| 4,581,730 | 4/1986 | Ozeki | 370/2 |
| 4,621,376 | 11/1986 | Nakamura | 455/618 |
| 4,662,004 | 4/1987 | Fredrikson | 455/618 |
| 4,768,186 | 8/1988 | Bodell | 370/3 |
| 4,893,300 | 1/1990 | Carlin | 455/617 |

FOREIGN PATENT DOCUMENTS 2150383  6/1985  United Kingdom ............... 455/618

OTHER PUBLICATIONS

IEEE Transactions on Microwave Theory and Techniques, vol. 38, No. 5, May 1990 "Lightwave Subcarrier CATV Transmission Systems" by Thomas E. Darcie and George E. Bodeep.

Primary Examiner—Reinhard J. Eisenzopf
Assistant Examiner—L. Pascal
Attorney, Agent, or Firm—John P. Dellett; William K. Bucher

[57] ABSTRACT

A low distortion optic fiber network having a feedback system which injects pilot tones into a base band input signal directly modulating an LED, optically detects the output resulting from the pilot tones, digitally samples the detected signal, and generates correction coefficients. The correction coefficients and the base band input signal are input to a correction circuit that pre-distorts the input signal in a non-linear manner and uses the distorted signal to modulate the LED. Pre-distorting the LED input signal compensates for the non-linearities of diode transfer characteristics and intermodulation between signals in the network thereby reducing harmonic and intermodulation distortion.

21 Claims, 13 Drawing Sheets

APPARATUS AND METHOD FOR REDUCTION OF INTERMODULATION DISTORTION IN AN OPTICAL FIBER NETWORK

BACKGROUND OF THE INVENTION

The present invention relates to reduction of harmonic and intermodulation distortion in an optical fiber network and more specifically to a circuit and method that pre-distorts the modulating input signal of a light emitting or laser diode to compensate the non-linear transfer characteristics of the diode.

In an optical fiber network, a large number of signals, e.g. TV signals, are frequency multiplexed to form a base band signal which is subsequently employed to modulate the output of a light emitting diode (LED) or laser diode. The intermodulation distortion between signals is caused by the non-linear transfer characteristics of the diode and may induce a significant level of interference in the network thereby distorting the output signals, reducing the efficiency of the network, or possibly rendering the network inoperable.

In U.S. Pat. No. 4,032,802, and apparatus is disclosed employing a compensating diode and a light emitting diode connected in parallel for DC biasing and in anti-series with respect to an AC signal source. The patent asserts that the non-linear junction capacitance of the LED is responsible for the undesirable harmonic distortion and intermodulation products. To reduce distortion problems, a compensating diode matching the LED as nearly as possible with respect to capacitance characteristics is selected, with the bias point of the diode being adjusted to equalize the effects of the diode capacitance. This method may reduce harmonic and intermodulation distortion in the LED to some extent but will not totally eliminate the distortion products in the output signal. Additionally, the LED will saturate as the input current is increased, and the diode's output power will fall off accordingly. The output power of the diode plotted with respect to the input current falls off non-linearly as the current is increased, as shown by curve 20 in FIG. 1.

FIG. 2 is a simplified view of a fiber optic communication network 22 wherein an input signal 60 modulates an optical signal (not shown) of an LED 56 to form a modulated output signal 68 which is transmitted through an analog optic fiber network 70 where the modulated signal 68 is detected by a detector 32 thereby providing an output signal 69 corresponding to input signal 60. It is highly desirable that the detected output signal 69 vary linearly with respect to the input signal 60 modulating the LED. If, however, the transfer curve of the LED exhibits the non-linear characteristics previously described, the output signal will also vary non-linearly with respect to the input signal indicating the existence of intermodulation products between channels and distortion in the network.

SUMMARY OF THE INVENTION

In accordance with the present invention in order to compensate the effects of higher order harmonic distortion in an LED as well as saturation of the LED at increased current levels and intermodulation between signals in a fiber optic network, a feedback system is employed wherein pilot tones are injected into a base band signal that directly modulates the LED. An optical detector detects a portion of the modulated output signal resulting from the pilot tones, the detected signal being sampled and processed to generate correction coefficients that are input along with the original base band signal to a correction circuit. The correction circuit predistorts the base band input in a non-linear manner and thereafter modulates the LED with the corrected signal. This system compensates the non-linearities of the diode such that the output signal of the LED is directly proportional to the original undistorted input signal.

It is therefore an object of the invention to reduce harmonic and intermodulation distortion in an optic fiber network.

It is another object of the invention to compensate for the non-linear transfer characteristics of a light emitting diode.

It is yet another object to compensate for fall off in output power of an LED due to saturation.

It is a further object to reduce intermodulation distortion between signals in a multi-channel network.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The present invention relates to reducing intermodulation distortion between signal channels in an analog optical fiber network and more specifically to a circuit and method that pre-distorts the modulating input signal of a light emitting or laser diode to compensate the non-linear transfer characteristics of the diode. The system injects known signals (pilot tones) into the network, detects the distortion in the optical outputs resulting from these signals, and employs the distortion data to pre-distort the input signals to the network such that the output power of the diode is directly proportional to the original undistorted input current. Pre-distorting the input signals effectively cancels the intermodulation products between signals, particularly the third intermodulation product, and compensates for the fall off of the output power of the LED at higher current levels. Therefore, a signal output at a location on the network will vary linearly with respect to the corresponding input signal, and the level of noise and intermodulation distortion in the network will be reduced.

Figure 2:
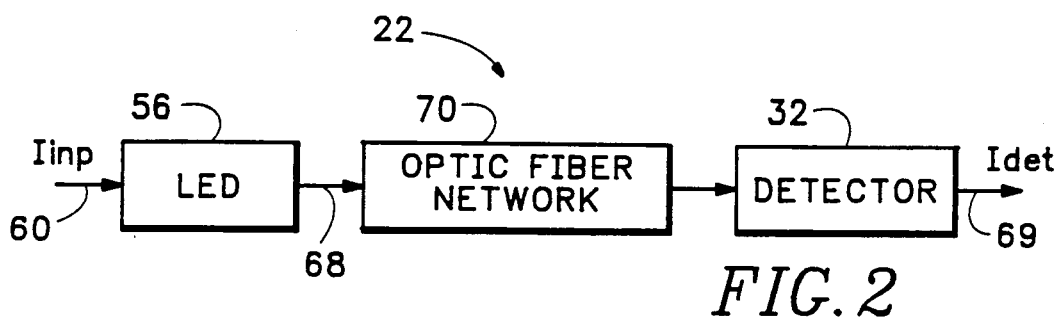
FIG. 2 is a block diagram of an optical network.
Figure 3:
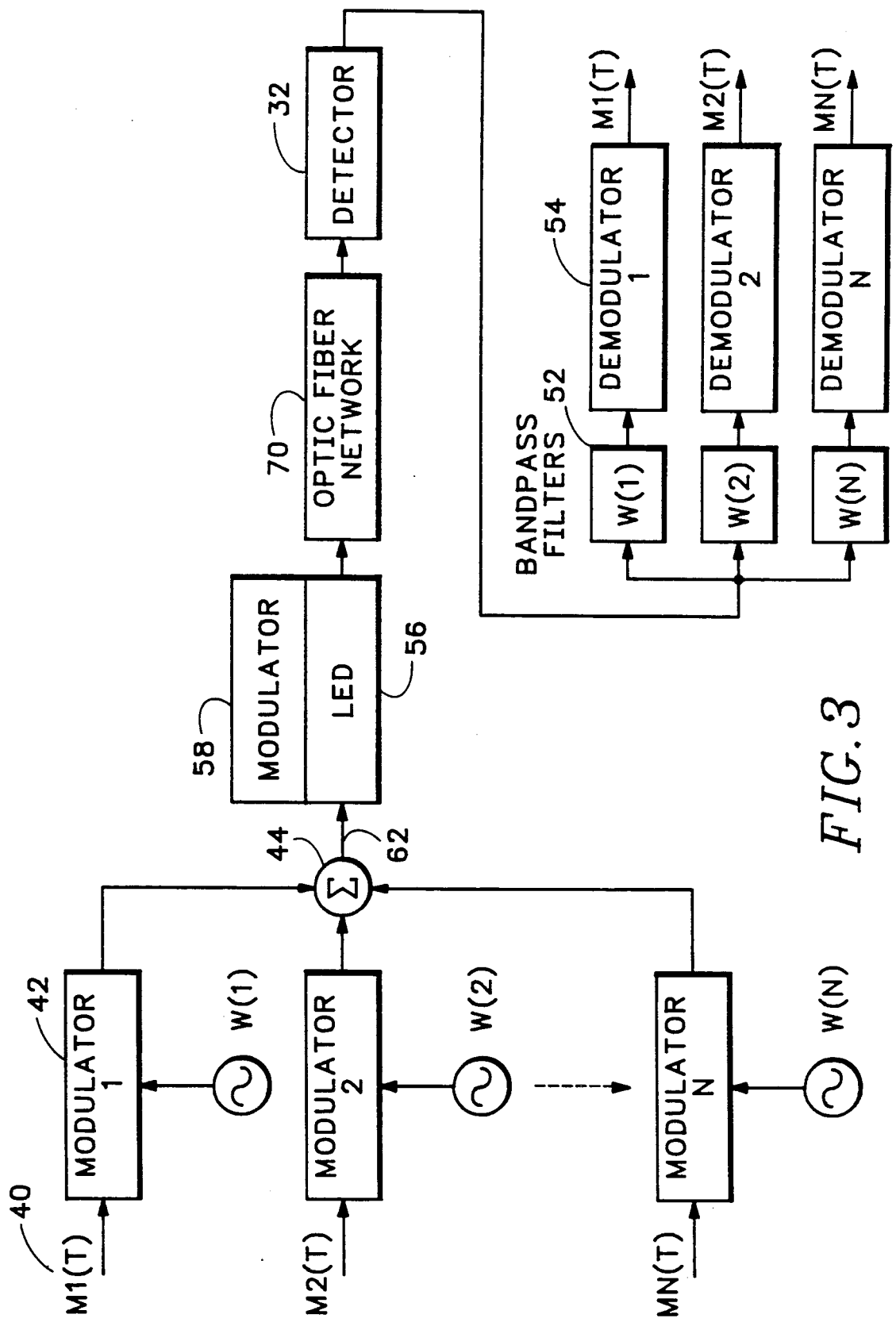
FIG. 3 is a block diagram of a multiplexed optical network.

FIG. 3 is a block diagram of one channel of an analog optical fiber network. N input signals (Mn(t)) 40, such as TV signals, are frequency multiplexed to form a base band signal at 62 for modulating the output of an LED, wherein N modulators 42 multiply each of the input signals by a different subcarrier frequency Wn. The subcarrier frequencies are adequately separated to avoid overlap or interference between the spectra of the input signals. The modulated input signals are summed together by a summing circuit 44 to form a composite signal that may be considered as the base band signal for modulating the LED 56 through a modulation circuit 58. As shown in FIG. 3, base band signal at 62 is the same as the input signal at 60 in FIG. 2.

The modulated optical output signal of the LED is distributed through the optic fiber network 70 to another location where detector 32 receives the modulated signal and provides an output signal corresponding to the base band signal. The individual TV signals are recovered by employing N bandpass filters 52, each filter being tuned to one of the subcarrier frequencies, and N demodulators 54 receiving the output of the respective bandpass filters. Ideally, the output of the demodulators would be the same as the input signals, but because of the non-linear transfer characteristics of the LED, the output signals will be distorted.

Figure 4:
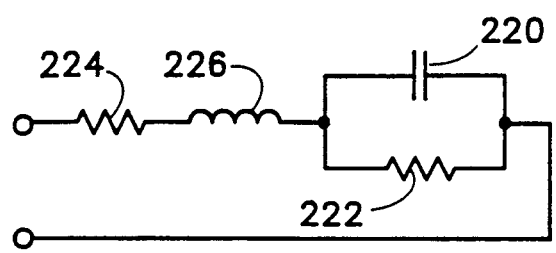
FIG. 4 is a schematic representation of an LED.
Figure 5:
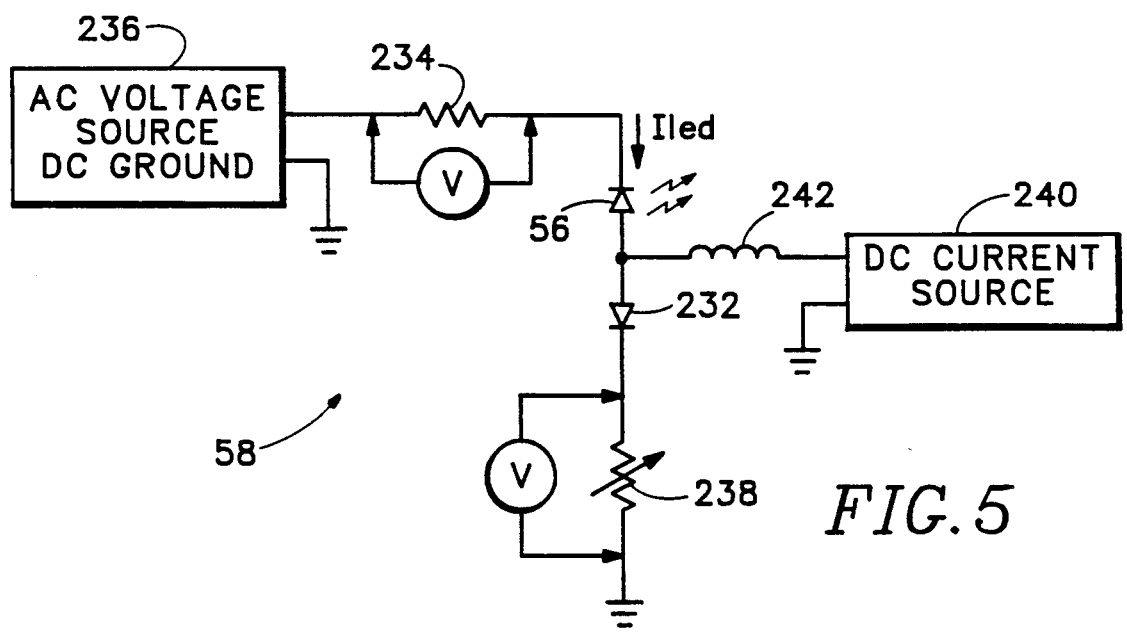
FIG. 5 is a schematic diagram of a modulating circuit for the LED.

The first step towards minimizing the distortion in the network and compensating the non-linear transfer characteristics of the LED is to configure the LED and the modulating circuit in such a way that the response of the diode is the best it can be without employing system level compensation such as pre-distortion of the modulating current of the LED according to the present invention. FIGS. 4 and 5 illustrate the LED and the direct modulating circuit employed to reduce the distortion in the output of the LED and improve its response.

In an LED equivalent circuit as illustrated in FIG. 4, junction capacitance 220 includes the diffusion capacitance and depletion layer capacitance, and is disposed in parallel with the forward resistance 222 of the LED. Resistor 224 in series with the LED represents the sum of the excess diode series resistance and the external circuit resistance, while series inductor 226 represents inductance mainly due to the bonding wire. In the forward biased operating region of an LED at normal operating frequencies (e.g. several hundred megahertz), the reactance of the junction capacitance is an order of magnitude greater than the forward resistance and it can be shown that changes of mismatches in the reactance of the capacitance have a limited effect on harmonic and third order intermodulation distortion when compared to variations in non-linear forward resistance characteristics.

FIG. 5 illustrates a modulating circuit 58 for reducing distortion and intermodulation in the LED, as set forth and claimed in my copending application entitled REDUCTION OF INTERMODULATION DISTORTION IN LIGHT EMITTING DIODES, Ser. No. 07/329,052, filed Mar. 27, 1989. LED 56 is electrically connected in anti-series (anode to anode in the illustrated case) with a compensating diode 232. The cathode of LED 56 is connected to a biasing resistor 234. The remote side of resistor 234 is connected to an AC voltage source 236 which is returned to ground while the cathode of compensating diode 232 is connected to one terminal of a variable biasing resistor 238 having its opposite terminal grounded. AC voltage source 236 corresponds to the base band signal or input signal that produces the input current for modulating the LED. The anodes of LED 56 and diode 232 are connected in parallel with respect to a DC current source 240 coupled to the anodes of the diodes via inductance 242 for blocking the AC signal. The DC current source biases the LED to emit an optical output signal that is modulated by the AC signal source. The DC current source is also returned to ground. Source 236 provides a DC ground for resistor 234, e.g. via a second inductance (not shown) in parallel with the source terminals.

Compensating diode 232 is desirably chosen to have a forward resistance characteristic (V vs. I characteristics) similar to the forward resistance characteristic of the LED and to have a capacitance value which may be on the order of but preferably less than the capacitance of the LED. Simulations have indicated that the reduction of even ordered harmonics is principally attributable to the anti-series connection of the diodes, i.e., wherein the push-pull circuit configuration tends to cancel the even order harmonics. Simulation and experimental evidence indicate that distortion in general is relatively invariant with modulating frequency, which confirms a lack of significance of capacitance differences. Moreover, simulations show harmonic and intermodulation distortion are reduced appreciably when the effects of forward conductance of the diodes are matched.

To achieve a close compensating match of the LED conductance characteristics, variable resistor 238 is adjusted such that the DC biasing currents in the two diodes are equal, with the currents being monitored at least initially by measuring the voltage across biasing resistor 234 and biasing resistor 238 respectively. A substantially compensating match can be achieved through adjusting the currents to be equal even though the resistances of the LED and the compensating diode are not quite the same, or resistance elsewhere in the circuit are not balanced.

Figure 6:
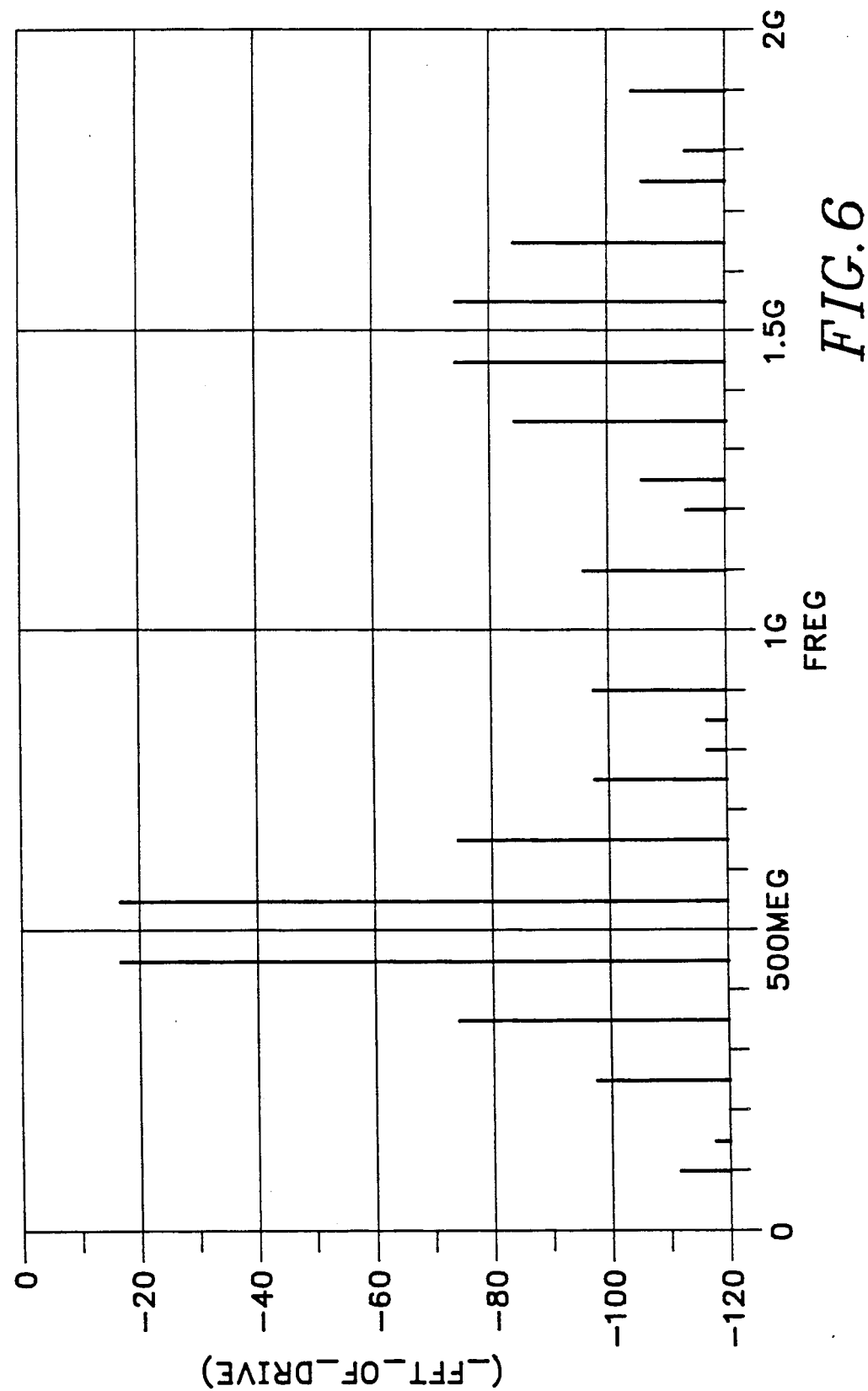
FIG. 6 is a simulated plot of amplitude vs. frequency spectrum for the modulating circuit.

The anti-series connection of the LED and the compensating diode reduce the distortion and particularly the distortion associated with the even order harmonics. In practice, obtaining an LED and a compensating diode with less than a 25% mismatch is difficult, and therefore matching as closely as possible the particular diode characteristic affecting harmonic and intermodulation distortion is important. FIG. 6 is a spectral plot associated with a 25% capacitive mismatch and a forward resistance match between the diodes when driven with two input tones at frequencies of 450 and 550 Mhz. The second order harmonic distortion terms occur at 900 and 1100 Mhz having magnitudes of approximately −97 Db, and the third intermodulation distortion terms occur at 350 and 650 Mhz and have magnitudes of approximately −75 Db.

Figure 7:
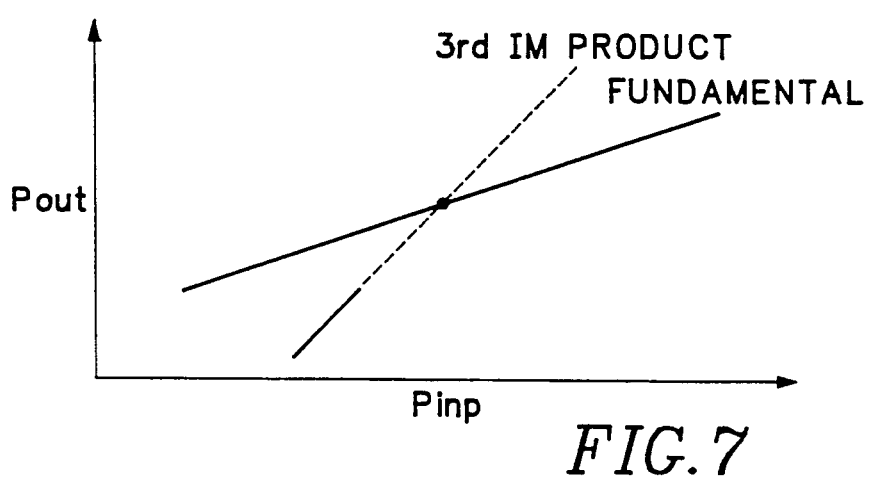
FIG. 7 is a plot of output power vs. input power for the modulating circuit.

FIG. 7 is a plot of output power vs. input power in the linear region of the LED for the fundamental frequencies (450 and 550 Mhz) and the third order intermodulation frequencies for the circuit shown in FIG. 5. The fundamental power varies linearly with a slope of one, whereas the third order intermodulation product increases with a slope of three as input power is increased. These lines intersect at a point referred to as the third order intermodulation intercept, whereby for input power levels exceeding the intercept point the intermodulation power surpasses the fundamental output power. For normal operation, it is desirable to stay well below the intercept point such that the third order intermodulation product is much less (e.g. −60 Db) than the output power at the fundamental frequency. Furthermore, the fifth order intermodulation product (not shown) varies linearly with a slope of five and may also surpass the power at the fundamental frequency if the input power is too high.

The magnitudes shown in FIG. 6 represent the distortion levels that can be achieved while operating at power levels far below the third intermodulation intercept without pre-distorting the input current to the LED. To improve the distortion levels substantially by compensating for the fall off in output power of the diode at higher current levels and the predominance of the intermodulation products at power levels near the third intermodulation intercept, the modulating circuit and LED shown in FIG. 5 are desirably used in combination with a feedback system as illustrated in FIG. 8.

Figure 8:
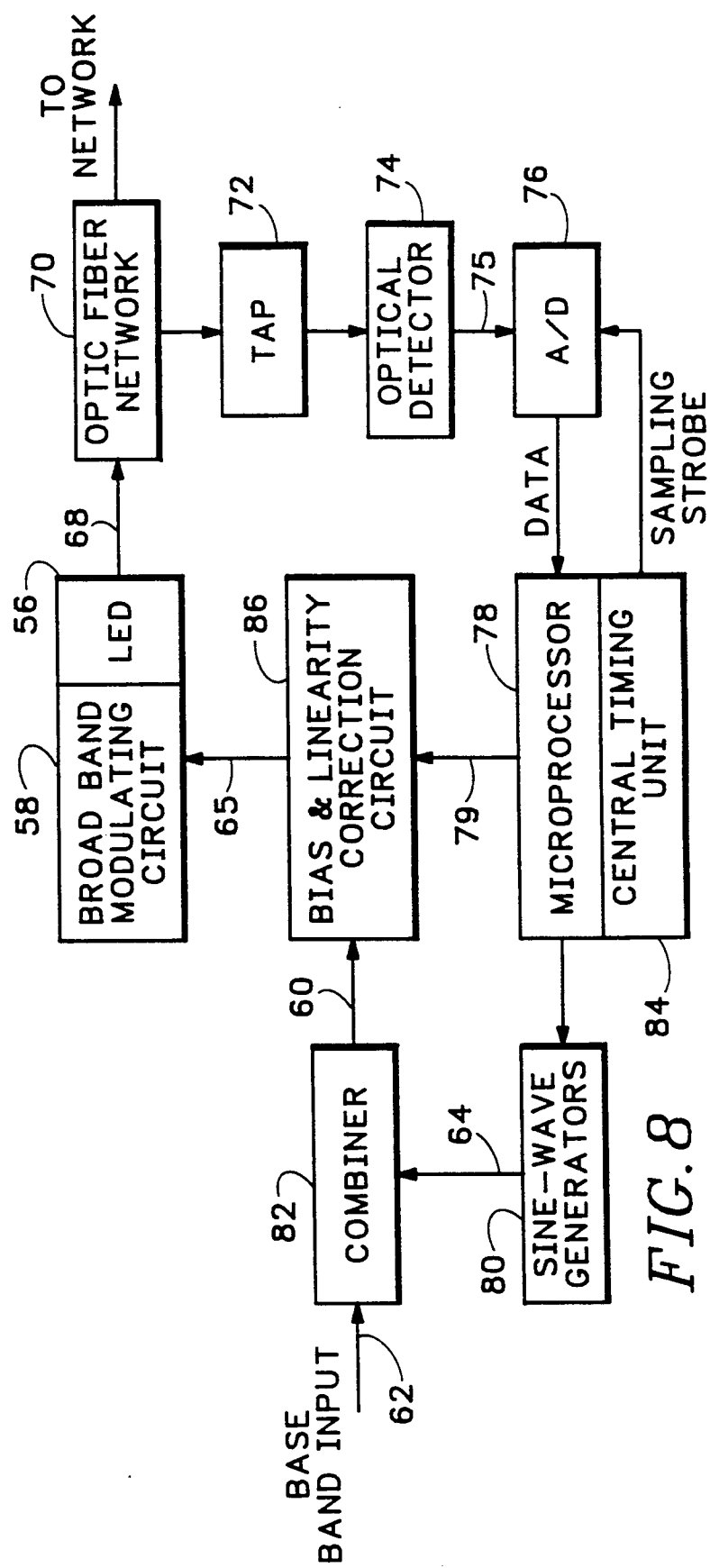
FIG. 8 is a block diagram of a system for pre-distorting the modulating signal of an LED for reducing intermodulation distortion in an optical network.

FIG. 8 is a block diagram of a system embodying the present invention for pre-distorting the input current to the LED such that distortion, and in particular third order intermodulation distortion in the individual signals and between the signals, is reduced. The signal at 60, comprising the base band signal from the input 62 and two pilot tones provided at 64, is pre-distorted by correction circuit 86 to form a corrected input signal at 65. This input signal corresponds to the AC voltage from source 236 in FIG. 5 and produces the modulating current in the LED. The input signal at 65 is a non-linear function of the input signal delivered at 60 and is input to LED 56 via the broad band modulating circuit 58 (as shown in FIG. 5) to modulate the optical output of the laser diode to form the modulated output signal at 68. The base band signal represents the composite signal formed by multiplexing N input signals as shown in FIG. 3, wherein the individual input signals 40 are located between 50 and 500 Mhz, whereas the pilot tones are injected at much lower frequencies, e.g. 10 and 12 Mhz so that the pilot tones will not create distortion in the input signals. The modulated output signal 68 is distributed through the optic fiber network 70.

A tap 72 diverts a small portion of output signal from point 68 to an optical detector 74 that generates a detected RF signal at 75. The signal on lead 75 corresponds to the input signal at 65 including distortion caused by the diode's transfer characteristics and intermodulation products. If correction circuit 86 has compensated the system correctly, the signal at 75 will be directly proportional to input signal at 60 indicating the overall response of the system is linear. An A/D converter 76 samples the detected signal 75 at a rate sufficient to extract frequency components generated by the pilot tones including the fundamental, harmonics, and intermodulation products.

A microprocessor 78 performs a fast fourier transform (FFT) on the digital samples to determine the frequency spectrum associated with the pilot tones, calculates a distortion level in the spectrum, and generates correction coefficients, applied at 79, for pre-distorting signal 60 to form input signal 65 that compensate the non-linear response of the LED. The processor also controls sine-wave generators 80 for generating two pilot tones delivered at 64. Two signals are needed to create intermodulation distortion and by supplying two controlled tones the system can evaluate the intermodulation distortion and compensate the input signal accordingly. The two pilot tones and the base band input 62 are added by a combiner circuit 82 to form the input signal for correction circuit 86 on lead 60. A central timing unit 84 receives signals from the processor and generates a sampling strobe for the A/D converter. Because the processor controls the exact amplitude and frequency of the pilot tones, the sampling strobe frequency may be set at an optimum rate whereby the FFT may be relatively short (e.g. 256 samples).

Correction coefficients indicated at 79 and the input signal on lead 60 are applied to the bias and linearity correction circuit 86 which pre-distorts signal 60 to form a corrected input signal 65 that compensates the LED. Multipliers and digital attenuators (FIGS. 12–14) are configured to receive input signal 60 and correction coefficients 79, and to generate the signal indicated at 65 having the general form of a power series, $V_{cor} = C_o + C_1*V_{inp} + C_2*V_{inp}^2 + C_3*V_{inp}^3 + \ldots$ wherein $V_{cor}$ corresponds to the input signal at 65 and $V_{inp}$ is the input signal 60. $C_o$ represents a DC bias term.

Figure 1:
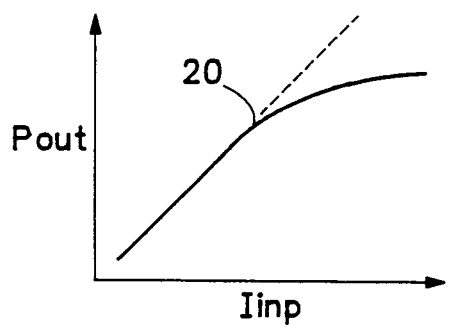
FIG. 1 is a plot of output power versus input current of an LED.
Figure 9:
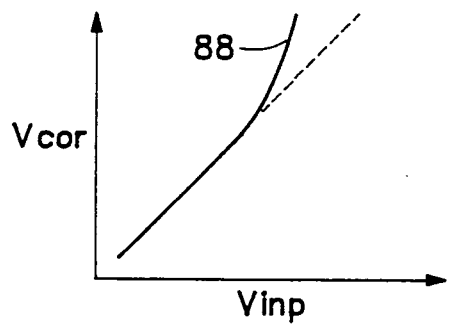
FIG. 9 is a plot of corrected current versus the input current showing the non-linear pre-distortion of the system.
Figure 10:
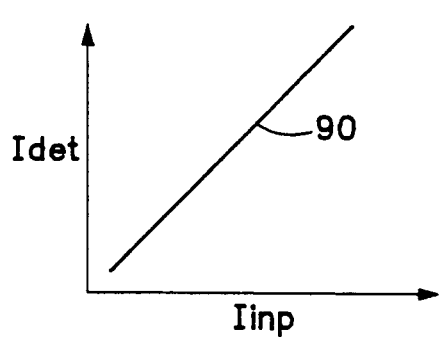
FIG. 10 is a plot of the output signal versus the undistorted input signal showing the resultant linearity of the network.

The non-linear relation between $V_{cor}$ and $V_{inp}$ is shown in FIG. 9 as a response curve 88 which increases in non-linearity as the input voltage increases, whereas in FIG. 1 the output power falls off or decreases non-linearly as the input current increases. The signals transmitted in the network and employed to operate digitally controlled attenuators and multipliers are voltage signals whereas a current signal directly modulates the LED. The system combines the effects shown in FIGS. 1 and 9 thereby creating an overall system transfer curve 90 as shown in FIG. 10 exhibiting a linear relationship between the output signal of the network and the corresponding input signal at 60. This linear relationship with a substantial reduction in third order intermodulation distortion are indicative of the fact that the non-linear transfer characteristics of the LED have been effectively compensated and substantially reduced along with noise in the network. Because the transfer characteristics of the LED may change over time, the output is sampled and new correction coefficients generated every one or two minutes.

Figure 11:
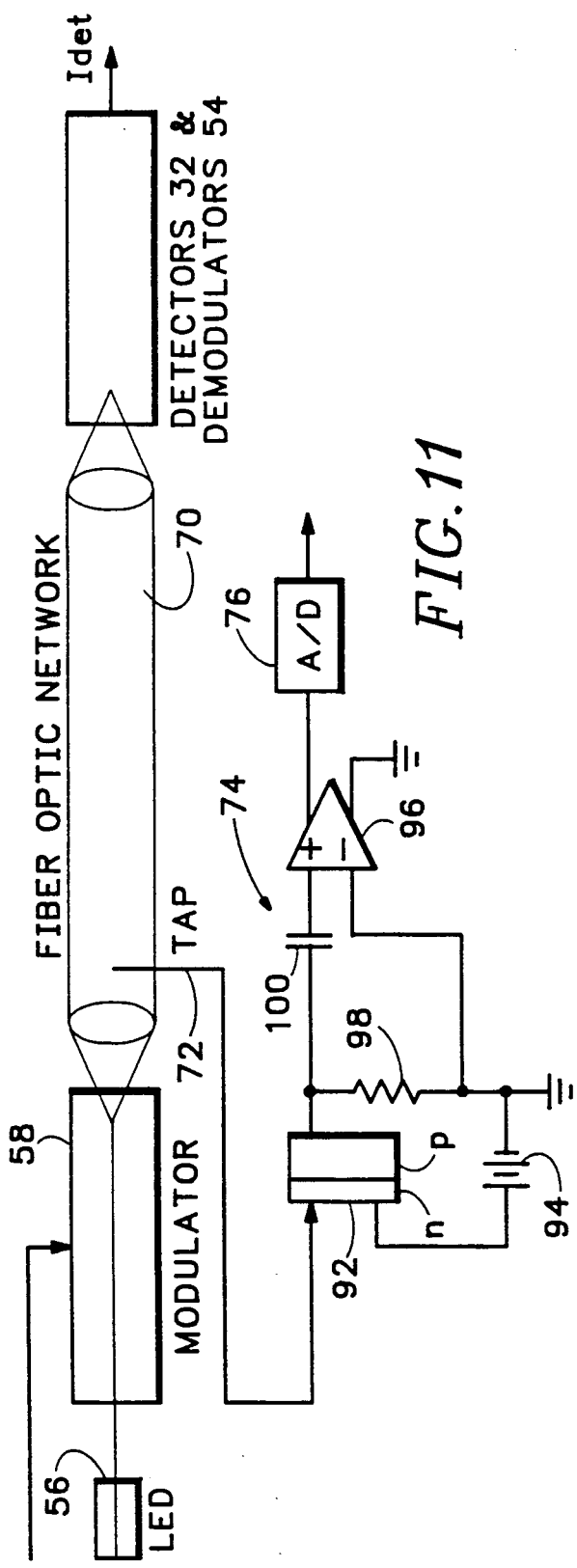
FIG. 11 is a schematic diagram of an optical detector.

FIG. 11 is a diagram of the optical detector 74 employed in the correction system to provide the detected signal (at 75) which represents the LED distortion and intermodulation effects on the input signal at 65 (in FIG. 8) modulating the LED. The LED 56 is biased to emit an optical output signal directly modulated by the corrected input signal 65 in modulator 58 thereby generating the modulated output signal 68 distributed through the optic fiber network 70. Signal 68 is detected and demodulated at locations throughout the network as shown in FIG. 3.

The tap 72 diverts a portion of the optical signal to optical detector 74, the optical signal being incident upon the n-type face of a p-n photodiode 92 for generating an output at 75 corresponding to the signal at 65 modulating the LED, including the distortion induced by the LED. The p-n photodiode 92 is biased by voltage source 94 wherein the positive side of the voltage source connects to the n side of the diode and the negative side is grounded. The signal is next amplified by an amplifier 96 having a resistor 98 coupled between the inverting and non-inverting input terminals thereof. The non-inverting terminal is coupled via capacitor 100 to one end of resistor 98 as well as to the p side of the photodiode while the inverting terminal of the amplifier is returned to ground. The output of the amplifier is sampled by A/D converter 76.

The optical detector 74 can induce some distortion in the signal but the level will be negligible. A typical network may have twenty taps and therefore each signal would represent approximately 5% of the output signal. Since the power level of the detector is only 1/20 the power level of the LED, the amount of distortion of the type shown in FIG. 7 will be small.

Figure 12:
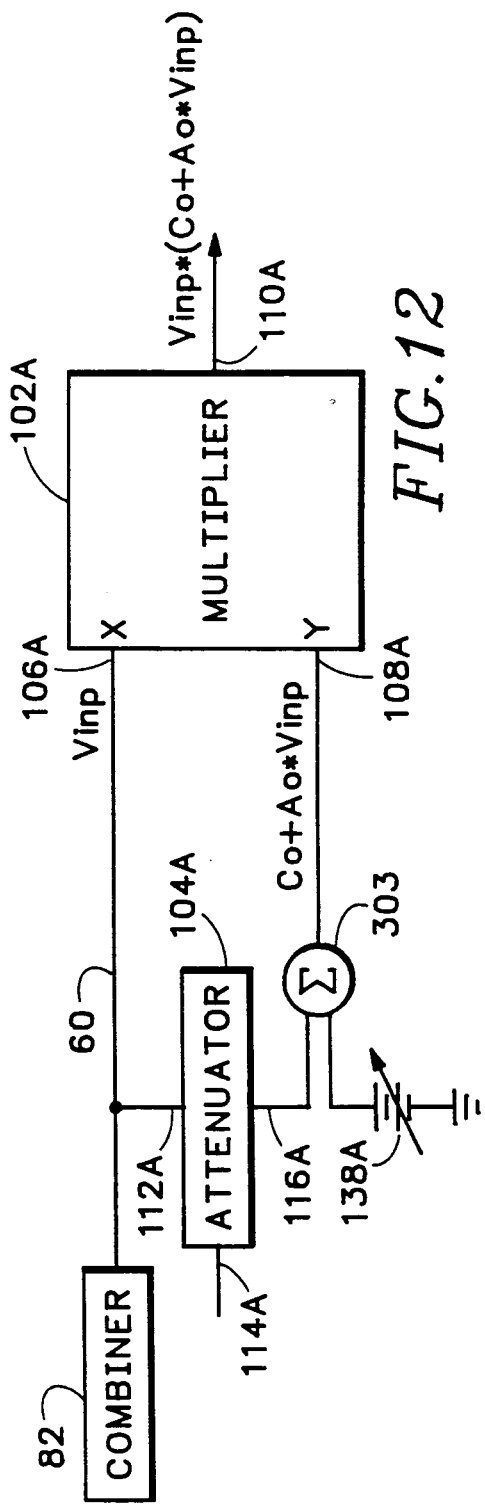
FIG. 12 is a block diagram of the fundamental correction circuit block.
Figure 13:
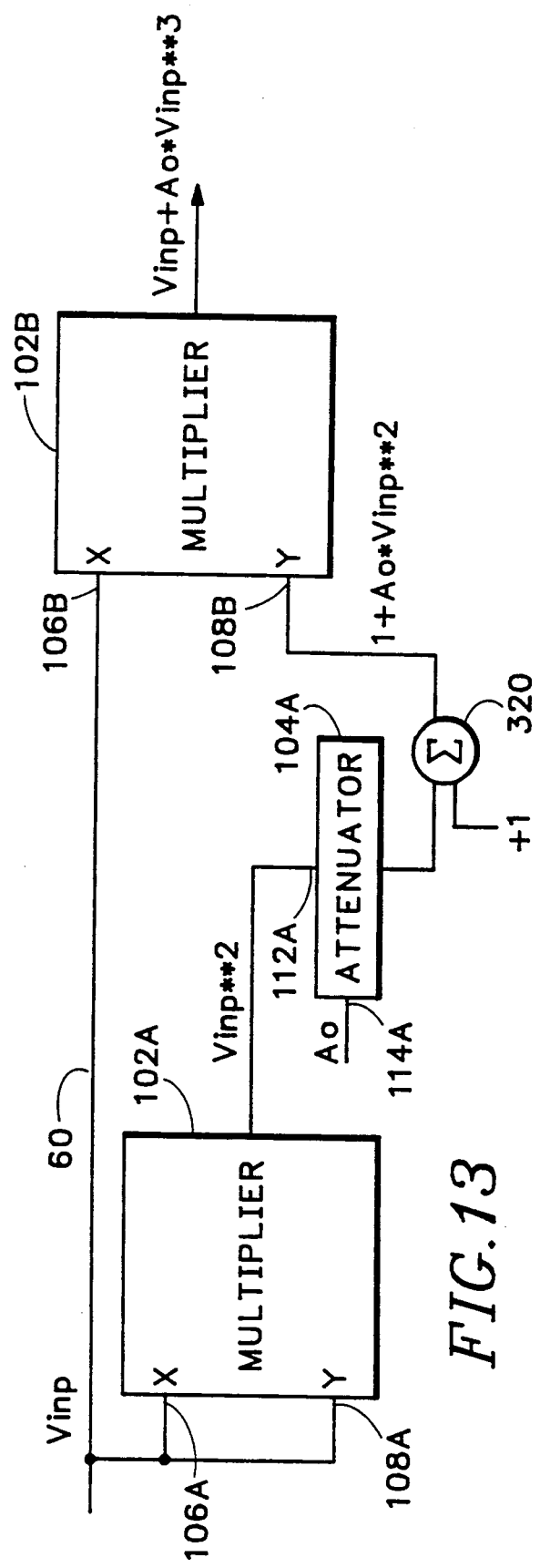
FIG. 13 is a block diagram of a preferred embodiment of the correction circuit.

FIGS. 12-13 illustrate varying configurations for correction circuit 86 of FIG. 8. FIG. 12 illustrates the basic connection of a multiplier 102A and a digitally controlled attenuator 104A for generating the non-linear corrected input signal 65 from input signal 60 from combiner 82 (as also illustrated in FIG. 8), with correction coefficients 79 being provided by the microprocessor 78. The multiplier 102A has X and Y inputs 106A and 108A respectively and an output 110A, while the digitally controlled attenuator is provided with an input 112A for receiving an input voltage, an input 114A for receiving one of the correction coefficients 79 from the microprocessor, and an output 116A. Input signal 60 is supplied to the X input of the multiplier as well as to input 112A of the digitally controlled attenuator, and the output 116A of the digitally controlled attenuator is connected to one input of a summing circuit 303. A variable bias voltage source 138 is connected to the other input of the summing circuit to provide a dc term, suitably equal to one. The output of the summing circuit is connected to the Y input of the multiplier. The output of the multiplier 102A provides the AC voltage for modulating the LED.

For example, if input signal 60 is indicated as Vinp and the correction term at 79 is $A_§$, the Y input of the multiplier is $C_o + A_§ * Vinp$ and the output of the multiplier is $C_o * Vinp + A_o * Vinp^2$. The modulating current of the LED is in part directly proportional to the second order output of the multiplier which provides some measure of correction for the non-linearities of the LED. This configuration has the advantage of comprising only a single stage but the limitation of only producing a second order term. Since the transfer characteristics of the LED are substantially linear at lower power levels and increasingly non-linear at higher power levels, it is desirable to employ a correction circuit that also supplies higher order terms.

A number of circuit blocks as shown in FIG. 12 can be interconnected and modified to produce a desired variation of the general form $Vcor = C_o + C_1 * Vinp^2 + C_2 * Vinp + C_3 * Vinp^3 + \ldots$. For example, the circuit may be constructed in this manner to supply an output, $Vcor = Vinp + C_3 * Vinp^3 + C_5 * Vinp^5$. The third order correction coefficient is equal to the error at the third order intermodulation frequency which can be expressed as MAG(3IMFREQ)/MAG(FUND), these terms being further described hereinbelow. The fifth order correction coefficients provided from the microprocessor to digitally controlled attenuators are desirably equal to about three times the square of the second previous term, i.e. $C_5 = 3*(C_3)^2$. Microprocessor 78 iteratively adjusts the correction coefficients to provide minimal system distortion.

FIG. 13 illustrates a preferred embodiment of a correction circuit. The input signal, Vinp (corresponding to signal 60 in FIG. 8) is provided to the X input 106A and Y input 108A of multiplier 102A as well as to the X input 106B of multiplier 102B. The output of multiplier 102A is connected to the input 112A of attenuator 104A. The binary coefficient $A_o$ is supplied from the microprocessor to input 114A of attenuator 104A, which then outputs an analog voltage equal to $A_o * Vinp^2$ for application to one input of summing circuit 320. A plus one is provided to the other input of summer 320 whereby the summer supplies a signal $1 + A_o * Vinp^2$ to the Y input 108B of multiplier 102B. Multiplier 102B then outputs a voltage $Vinp + A_o * Vinp^3$ which is employed as the corrected input signal 65 to the modulating circuit in FIG. 8.

The distortion in the system can be reduced significantly by correcting only the third intermodulation term. Such embodiment reduces the hardware required and increases the speed of correction. However, fifth order correction coefficients may be easily incorporated by extending the circuit to further reduce distortion and enhance system performance.

Figure 14:
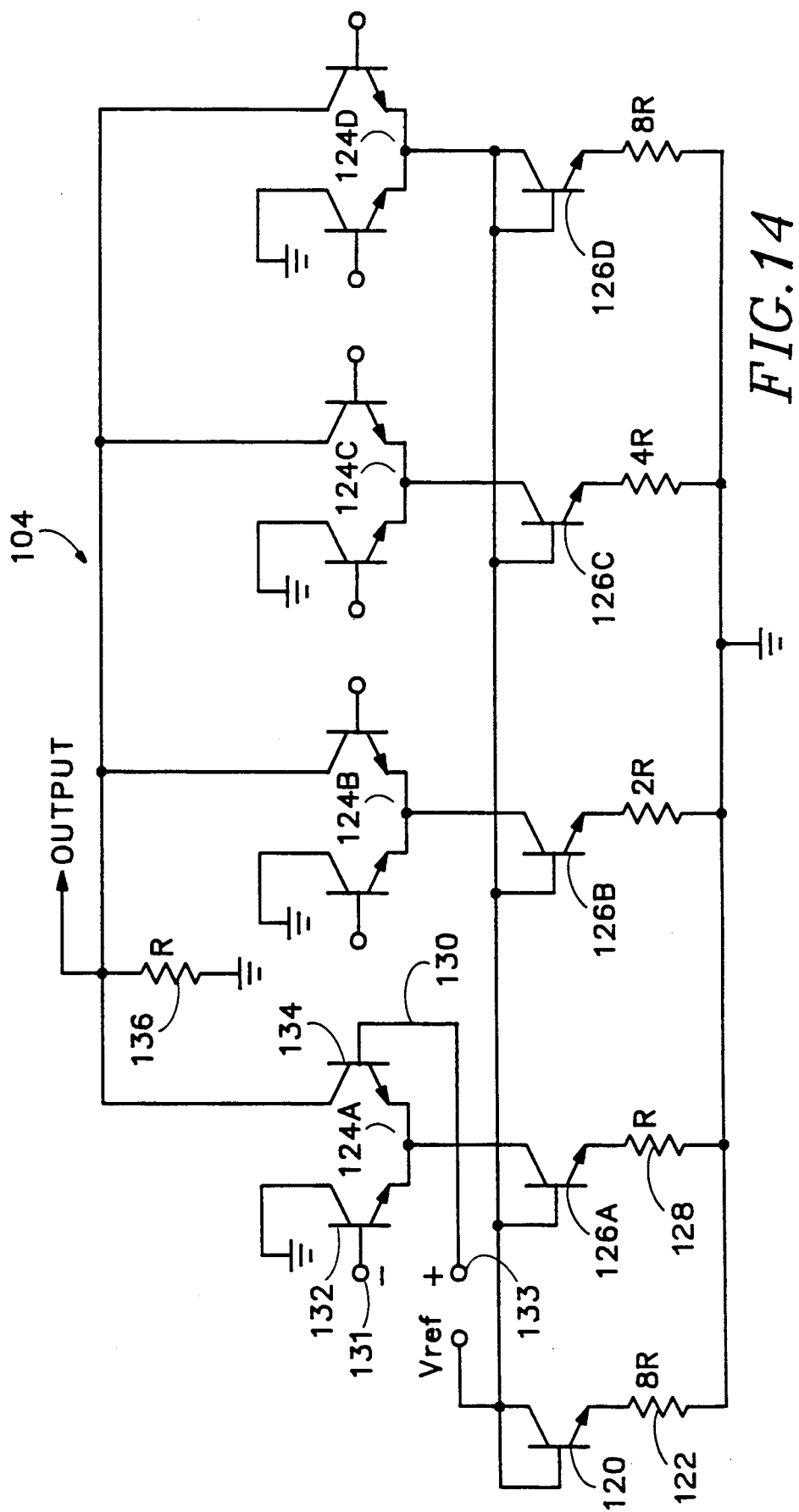
FIG. 14 is a schematic diagram of a digital attenuator.

FIG. 14 is a schematic representation of a digitally controlled attenuator 104. This particular embodiment is a four bit bipolar attenuator that receives a four bit correction coefficient from the microprocessor and a reference voltage provided by the input signal, and outputs a controlled fraction of the reference voltage in the range of v/8 to 15v/8. This fraction controls the linearity of curve 88 shown in FIG. 9. The reference voltage is connected to the base and collector of a bipolar transistor 120 the emitter of which is connected through a resistor 122, having a value of 8R, to ground.

The 4-bit attenuator further comprises four substantially similar circuits 124A-D, one for each bit, for setting the output level. Each of the circuits 124A-D comprises a bipolar transistor 126, a biasing resistor 128 connected between the emitter of transistor 126 and ground, and a current steering circuit 130 connected between the collector of transistor 126 and the output of the attenuator. The base of each of the transistors 126A-D is connected to the reference voltage. Current steering circuit 130 in each case comprises first and second transistors 132 and 134 having their emitters connected to the collector of a corresponding transistor 126 and wherein the collector of transistor 132 is connected to ground while the collector of transistor 134 is connected to the output. A differential input voltage representing one bit of the correction term is applied between the bases of transistors 134 and 132 of each circuit 130 by leads 133 and 131.

The circuits 124A-D are differentiated only by the value of biasing resistor 128. The values of the four resistors 128 in this example are R, 2R, 4R and 8R respectively, with the value R corresponding to the most significant bit and the value 8R corresponding to the least significant bit of a correction coefficient 79. The collector of transistor 134 in each of the circuits is connected to the output provided across an output resistor 136 having a value R and returned to ground. The output of the digital attenuator is a voltage signal having a magnitude determined by the correction coefficient.

The voltage at the base of each transistor 126 corresponds to the reference voltage. When transistor 134 is off, i.e. a differential voltage corresponding to a logic level zero is applied between the bases of its transistors 134 and 132, the current in transistor 126 is steered to ground and that particular circuit does not contribute to the output. When transistor 134 is on, i.e. logic level one, the current in transistor 126 flows through output resistor 136 and sets the voltage at a controlled fraction of the reference voltage, the fraction being determined by the value of biasing resistor 128.

For example, if a correction coefficient received at 79 is the 4-bit quantity 0001 then a one will be input to circuit 124D and zeros input to circuits 124A-C. The resulting output voltage is $-(Vref/8R)*R = -Vref/8$. If a code of 1111 is input to the attenuator the output voltage is $-Vref(1/R+1/2R+1/4R+1/8R)*R = -(15/8)*Vref$. The output of the attenuator is applied differentially to a multiplier which corrects for the sign of the voltage.

Figure 15:
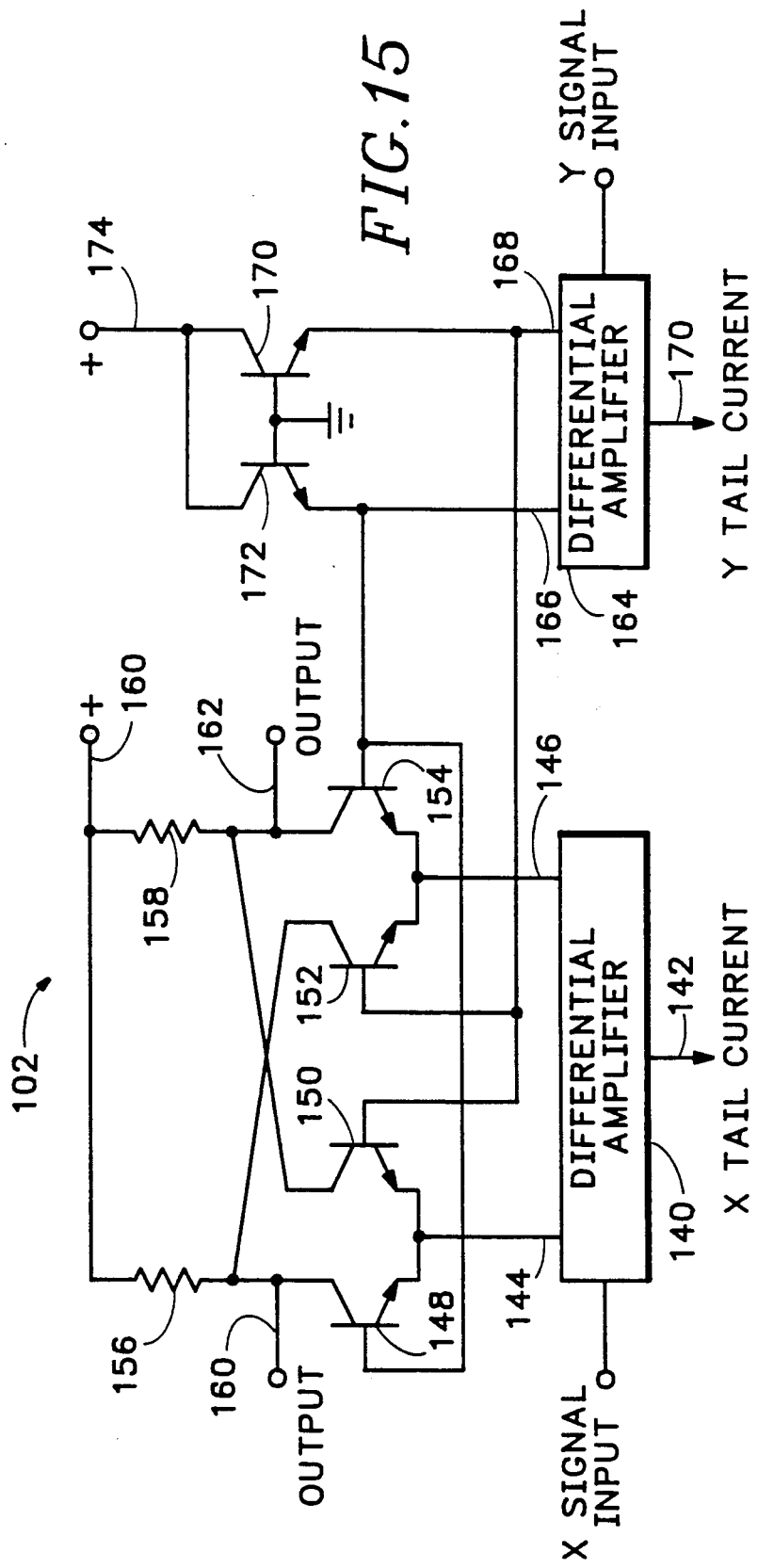
FIG. 15 is a schematic diagram of a multiplier.

FIG. 15 is a schematic diagram of multiplier 102, here comprising a four-quadrant multiplier as described and claimed in U.S. Pat. No. 4,156,283. A first signal input X is applied as an input to differential amplifier 140 for proportioning a substantially constant X tail current 142 differentially between two outputs 144 and 146. A first pair of differentially connected transistors 148 and 150 have their emitters connected together and connected to the output 144 while a second differential pair of transistors 152 and 154 include emitter terminals connected to the afore-mentioned output 146. The first and second pairs of differentially connected transistors have their collector terminals cross-connected to load resistors 156 and 158 through which supply current flows from a positive source 160. Thus, the collectors of transistors 148 and 152 are connected to resistor 156, while the collectors of transistors 150 and 154 are connected to resistor 158. The output is derived between terminals 160 and 162 connected respectively to the ends of the load resistors opposite the power supply.

A second differential amplifier 164 is employed for producing differential output currents 166 and 168 proportional to a Y input signal with output currents 166 and 168 totaling a substantially constant Y tail current 170. Output current 168 is connected to the base terminals of transistors 150 and 152, while the output current 166 is connected to the base terminals of transistors 148 and 154.

A pair of input device transistors 170 and 172 have their collector terminals connected to a positive source 174, their base terminals grounded, and their emitter terminals connecting respectively to the base terminals of transistors 150 and 152, and 148 and 154. The FIG. 15 circuit is effective for producing an output between terminals 160 and 162 proportional to the product of input signals X and Y taking the respective sign of X and Y into consideration. Thus, a four-quadrant multiplier is provided.

Considering the multiplying operation of the FIG. 15 circuit in greater detail, each of the differential pairs 148-150 and 152-154 has the property of performing a multiplying function. For instance, the transistor pair 148-150 will apportion the current on lead 144 between the transistor collectors in accordance with the product of such current and the differential voltage applied to the transistor bases.

Multiplication depends upon a non-linear or exponential characteristic of the transistors. The transconductance from base to collector of each of the transistors 148 and 150 is proportional to the emitter tail current. Therefore, as the current on lead 144 is increased, the differential output procured with transistors 148 and 150 in response to differential base voltage input is multiplied in proportion to the current on lead 144. Although the circuit multiplies as a result of non-linear operating characteristic, the multiplication is accomplished without distortion. The base voltages are "predistorted" as to the Y signal input factor. Thus, transistors 170 and 172 receive current outputs at 168 and 166 producing voltages across transistors 170 and 172 which are logarithmically related to the input currents. The ensuing exponential distortion in transistors 148 and 150 is cancelled by such logarithmic conversion. Multiplication is nontheless accomplished because of the non-linear operation of the transistor 148-150.

Of course, one pair of transistors does not accomplish four-quadrant multiplier operation. For this purpose, transistors 152-154 are also utilized, with the outputs of the two pairs being reversely connected. Each pair will have an opposite effect on the output. The "sign" of the ultimate output at 160-162 depends upon which pair output predominates, that is, upon which pair receives the larger emitter current from differential amplifier 140 and delivers the same to resistors 156 and 158. If the X input is at bias level, no differential output is produced. If the X input signal is above the bias level of amplifier 140, one of the leads 144, 146 will deliver more current than the other producing an output in a first sense. If the X input signal is below the bias level of amplifier 140, the opposite one of leads 144, 146 will deliver more current. The ultimate output will then depend not only on the magnitude but also on the sign of the X input.

Since each pair, e.g. transistors 148-150, is a differential circuit, the output "sign" will depend also on the "sign" of the Y signal input relative to the bias level of differential amplifier 164. If the Y signal input is at ground, and the bias level of amplifier 164 is at ground, equal outputs will be delivered at 166 and 168 whereby neither the output of transistor 148 nor the output of transistor 150 will predominate. Similarly, neither the output of transistor 152 nor the output of transistor 154 will predominate. However, if the Y signal is above or below bias level, the sense or sign of the output at terminals 160 and 162 will be governed accordingly. The magnitude of the output will be proportional to the Y input.

Figure 16:
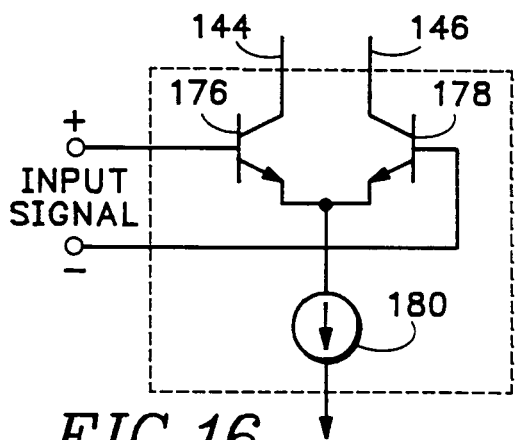
FIG. 16 is a schematic diagram of a differential amplifier.

FIG. 16 is a schematic of a possible configuration of differential amplifiers 140 and 164. The amplifier comprises first and second transistors 176 and 178 wherein their emitters are connected to a tail current source 180. The voltage signals are applied differentially between the bases of transistors 176 and 178. The output currents 144 and 146 correspond to the currents flowing through the collectors of transistors 176 and 178 respectively.

Figure 17A:
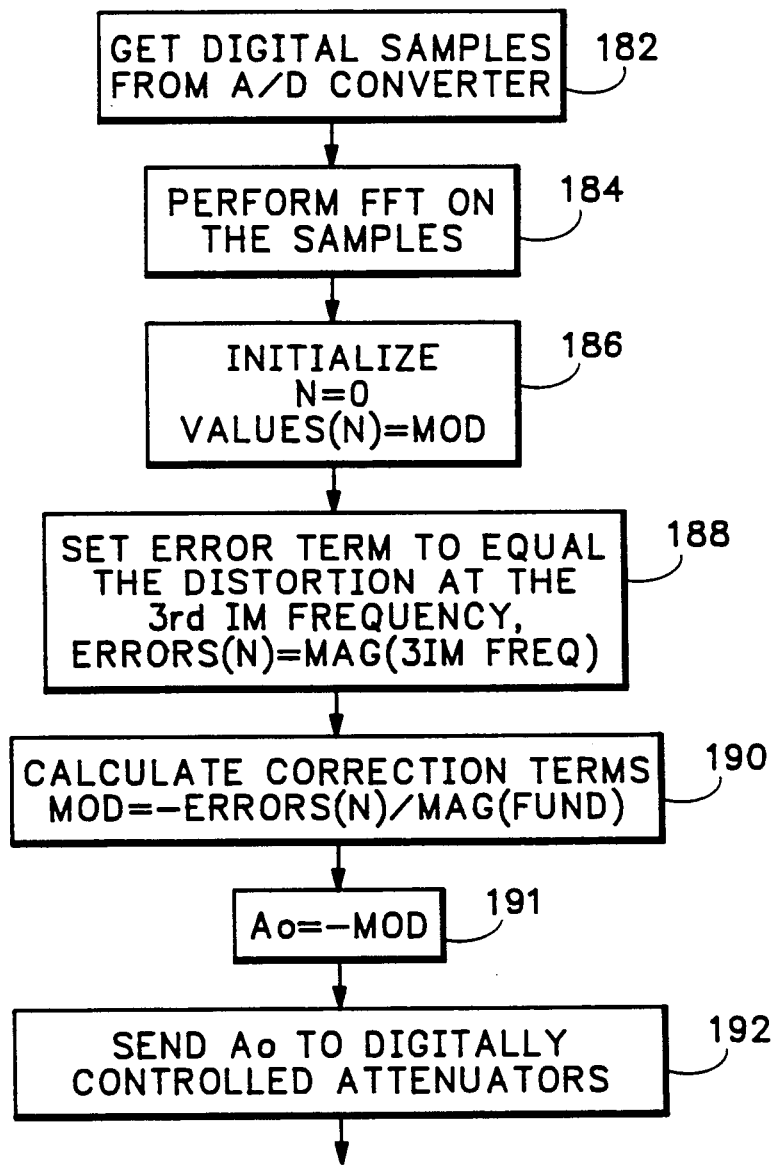
FIGS. 17A-B are flow charts illustrating generation of correction terms.
Figure 17B:
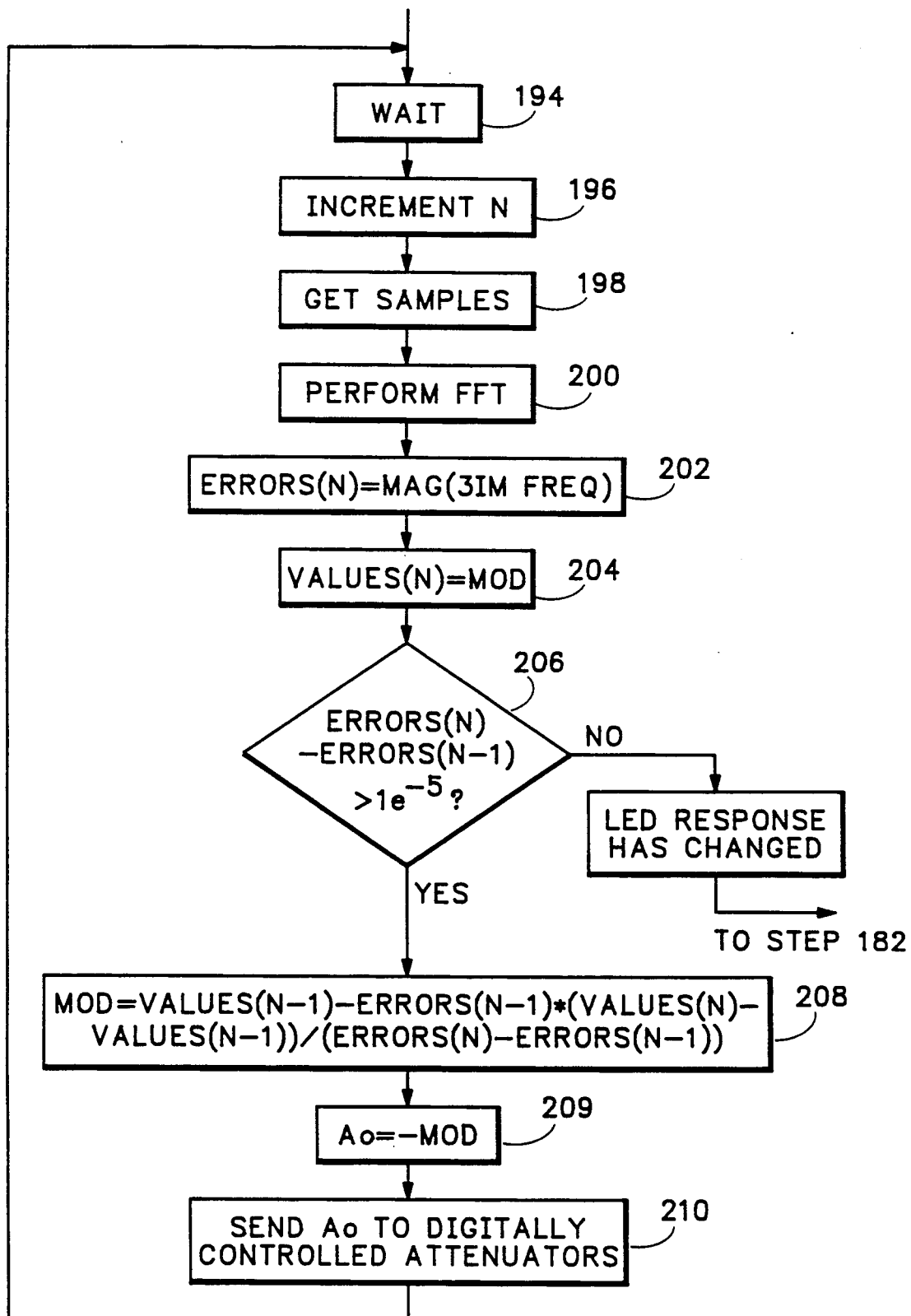

FIGS. 17A-B are flowcharts describing the operations of microprocessor 78 for iteratively calculating correction coefficients provided at 79 (FIG. 8) including third order coefficients indicated as $A_o$. The microprocessor receives the digital samples from the A/D converter 76 (FIG. 8) in step 182 and performs a fast fourier transform (FFT) on the digital samples (step 184) thereby generating a magnitude versus frequency spectrum for the digital samples. The A/D converter samples optical signal 68 at a rate sufficient to observe the effects of the fundamental, harmonics, and intermodulation products associated with pilot tones 64. Because the microprocessor controls the generation of the pilot tones, it "knows" their amplitude and frequency exactly and can therefore calculate a sufficiently accurate spectrum from a relatively short FFT, for example, 256 terms.

In step 186, the microprocessor initializes the state to zero (N=0) and sets values (0) to a last established third order correction coefficient, MOD. Since the process of generating correction coefficients occurs every one or two minutes, a previous correction coefficient will exist except for the very first execution, and because the response of the LED should not drift too substantially, the last correction coefficient is a suitable starting point. Thereafter, the microprocessor sets the initial error term (step 188) to equal the magnitude at the third intermodulation frequency, ERRORS(N)=MAG(3IMFREQ). The magnitude at the third intermodulation frequency represents the primary component of distortion in the signal and is therefore employed to determine the correction coefficient.

At step 190, the microprocessor calculates the correction coefficient MOD corresponding to the third order intermodulation term. MOD equals the negative of the value of the error term divided by the magnitude at the fundamental frequency of either one of the pilot tones.

MOD = −ERRORS(N)/MAG(Fund)

In step 191, the correction coefficient is set equal to minus MOD. The correction coefficient $A_o$ is, for example, a 4-bit binary code.

The microprocessor then waits (step 194) for the correction circuitry to adjust the modulating current of the LED and the A/D converter to obtain a new record of samples. The microprocessor increments N to the next state (step 196) and receives the samples from the A/D converter (step 198). The microprocessor performs an FFT on the samples (step 200), sets ERRORS(N)=MAG(3IMFREQ) (step 202), and equates VALUES(N)=MOD (step 204).

In step 206, the difference in the error terms from the current state and the previous state is ascertained and if their difference exceeds a value, for example, an arbitrarily selected amount of $1e^{-5}$, new correction coefficients are calculated. The third order correction coefficient calculated in step 208 is given by operation 1 below:

MOD=VALUES(N−1)−ERRORS(N−1)*-
(VALUES(N)−VALUES(N−1))/(ERRORS(N-
)−ERRORS(N−1))

The correction coefficient $A_o$ is set equal to minus MOD at step 209 and is sent to the digitally controlled attenuators in step 210.

If at step 206, the error terms differ by less than $1e^{-5}$, the system has drifted between measurements. If the response of the LED has changed, the system resets and starts over at step 182. It has been found that the program converges very quickly, usually in two iterations, thereby producing very accurate correction terms very quickly, and providing an overall system response that is substantially linear.

Figure 18:
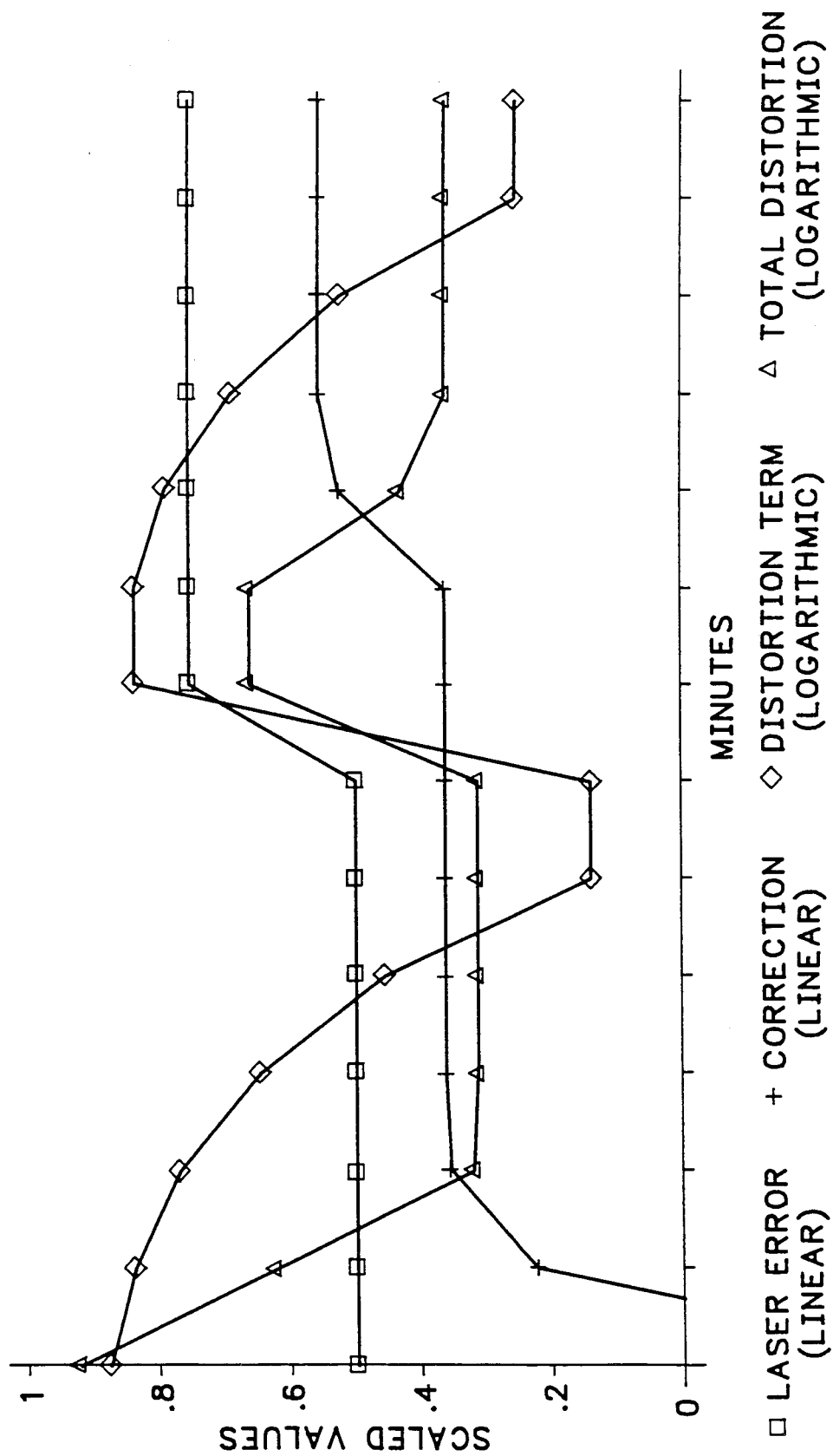
FIG. 18 is a simulated plot showing system response versus time.

FIG. 18 is a plot showing the simulated system response versus time for the system illustrated in FIG. 8 and described hereinabove. Laser error, third intermodulation distortion, correction coefficient ($A_o$) and the total distortion are plotted with respect to time. The scaling of the functions is adjusted so that the functions are easy to observe.

The laser error plot between points each shown as a box in the figure is a simulation parameter that represents the physical device characteristics of the LED shown in FIG. 4 that cause the nonlinear response of the diode. The scale for laser error is linear and has a range of 0.01 to 0.03 with the initial error being simulated as 0.02. A perturbation in the LED is simulated by changing this value to 0.025 at the seventh sampling interval. If the response of the diode is represented as Pout=Iinp+C*Iinp$^3$, the laser error is represented by the constant C and controls the non-linearity of the response.

The third intermodulation distortion product illustrated by a diamond is plotted on a logarithmic scale from 0 Db down to −150 Db. The initial third intermodulation product without any compensation is approximately −20 Db. This value represents the third intermodulation distortion after adjusting the modulating circuit but before employing system level compensation. As shown in FIG. 6, the third intermodulation product was reduced to −75 Db. The important characteristic shown in FIG. 18 is the substantial reduction in distortion achieved by employing system level compensations.

The third order correction term MOD is shown by a plus sign on a linear scale of 0.01 to 0.03. The correction term is initially zero (no compensation), increases to approximately 0.014 after the first sampling period, and levels off at approximately 0.017 after three sampling periods.

The total distortion shown as a triangle is plotted on a logarithmic scale and starts at a relatively high value of −33 Db with no correction and is reduced to a plateau of −64Db in three iterations. The substantial drop in total distortion and improvement in system performance is achieved quickly and accurately.

When the system is perturbed at the seventh iteration, the distortion levels increase quickly but after two sampling periods the program converges as before and the distortion levels are reduced.

As shown in FIG. 18 and described herein, the system level compensation employed by the invention substantially increases performance by correcting for the non-linear response of the LED or laser diode. The system level correction adjusts for the fall off of the diode at increased power levels and the intermodulation products between signals, thereby lowering distortion, providing an overall system response that is linear, and effectively increasing the operating range of the diode.

Figure 19:
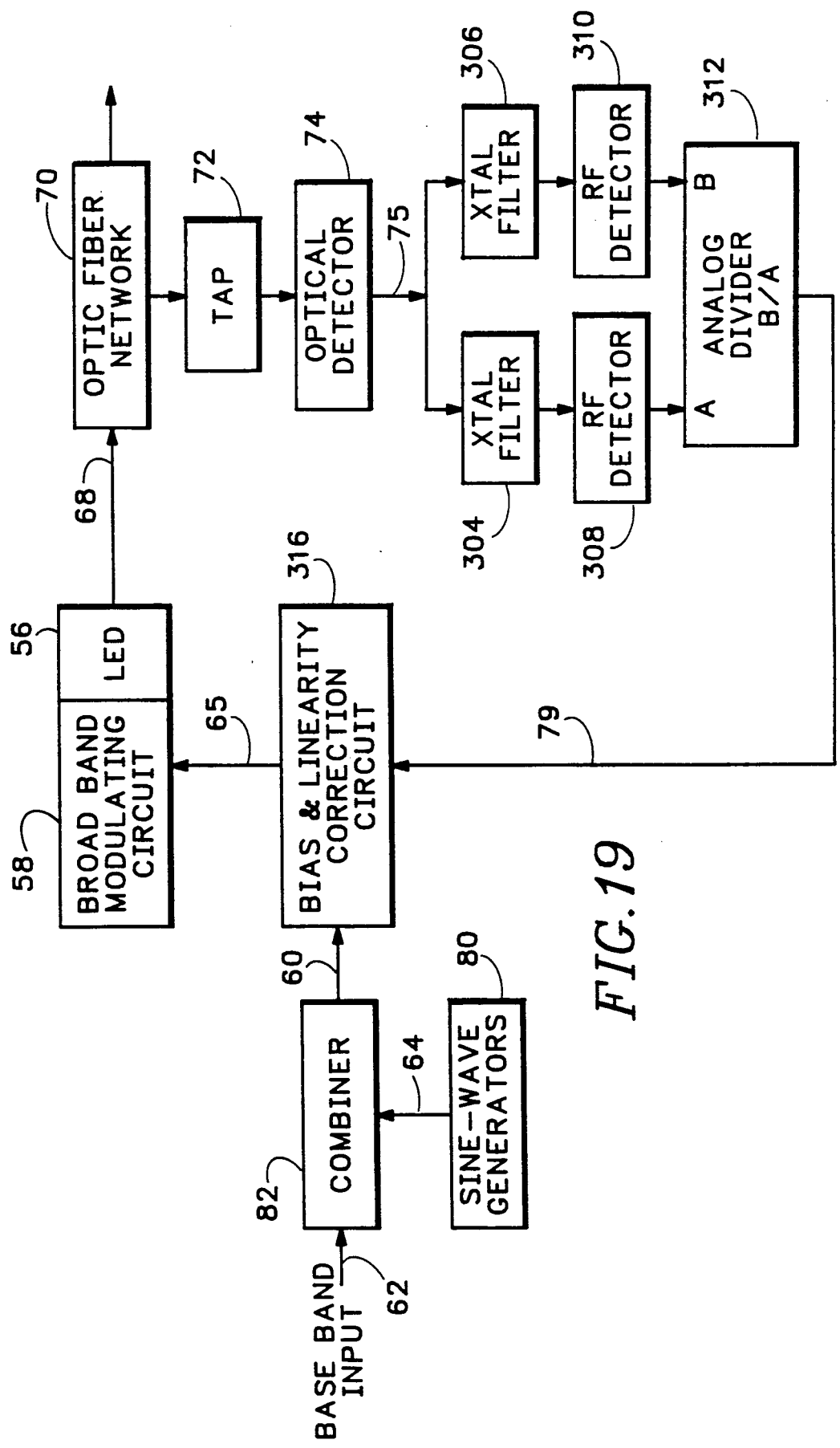
FIG. 19 is a diagram of an alternative embodiment of the invention employing analog circuitry.

FIG. 19 illustrates an alternative embodiment of the present invention for reducing intermodulation distortion in an optical fiber network. The digital circuitry shown in the FIG. 8 embodiment, consisting of the A/D converter, the micro-processor and the bias and linearity correction circuit, is replaced by analog circuitry. Two crystal filters 304 and 306 tuned respectively to one of the pilot tones and the third intermodulation frequency receive the detected RF signal at 75 from optical detector 74 and drive RF detectors 308 and 310 to produce outputs proportional to the magnitude of the pilot tone and the magnitude of the third intermodulation frequency. The pilot tone indicating output is supplied as the A input while the output indicating the third intermodulation frequency is provided to the B input of an analog divider 312 which outputs a voltage equal to B/A or MAG(3IMFREQ)/MAG(PILOT). This voltage is applied to bias and linearity correction circuit 316. Correction circuit 316 is similar to circuit 86 of the earlier embodiments but wherein the digitally controlled attenuator is replaced with an analog controlled attenuator.

This analog embodiment performs the same basic function as the digital embodiments regarding measurement of the magnitude of one of the pilot tones and the third intermodulation frequency for determining a correction coefficient. The analog implementation may also be easily expanded to include fifth or higher order terms by adding filters tuned to desired higher harmonics, together with means for comparing their outputs with the magnitude of the pilot tone.

The embodiments described in conjunction with FIGS. 8 and 19 describe systems for correcting the non-linear distortion at the system transmitter. The same type of circuitry can be applied to correcting the distortion at the receiver if so desired. Systems of the latter type may employ feed-forward circuits instead of feed-back circuitry, and employ a separate circuit at each receiver.

While plural embodiments of the present invention have been shown and described, it will be apparent to those skilled in the art that many other changes and modifications may be made without departing from the invention in its broader aspects. The appended claims are therefore intended to cover all such changes and modifications as fall within the true spirit and scope of the invention.

We claim:

1. An apparatus for compensating a light source to reduce distortion, said light source receiving an AC signal source and outputting a modulated optical signal, the apparatus comprising:
   semiconductor light source means having a nonlinear transfer curves outputting an optical signal,
   means for generating pilot tones,
   means for combining said pilot tones and the signal from said AC signal source to form an input signal, said input signal modulating the output of said light source means,
   detector means for detecting optical outputs resulting from the pilot tones,
   analyzer means for analyzing said optical outputs to determine the distortion in the modulated output signal as a function of the pilot tones and an intermodulation frequency resulting from the pilot tones, and
   circuit means responsive to the distortion for introducing countervailing nonlinearities to pre-distort said input signal as a function of the nonlinear transfer curve of the semiconductor light source means.

2. The apparatus according to claim 1 wherein said analyzer means determines a magnitude of the optical output at one of the pilot tones and a magnitude at an intermodulation frequency, and determines at least one correction coefficient from these magnitudes.

3. The apparatus according to claim 2 wherein said analyzer means comprises first and second filters, the first filter being tuned to said one pilot tone and the second filter being tuned to said intermodulation frequency.

4. The apparatus according to claim 3 wherein the intermodulation frequency is the third intermodulation frequency.

5. The apparatus according to claim 2 wherein said detector means comprises converter means for providing digital samples of the modulated output signal, and said analyzer means comprises processor means for determining the magnitudes and the correction coefficient.

6. The apparatus according to claim 5 wherein the frequency of each of the pilot tones is substantially lower than the frequency of the signal source, said converter means providing samples at a rate sufficient to represent the optical output resulting from the pilot tones.

7. The apparatus according to claim 5 wherein said processor means comprises a processor, said processor being programmed to:
   calculate a magnitude of the sampled output signal at one of the pilot tones,
   calculate a magnitude of the sampled output signal at an intermodulation frequency,
   compare the respective magnitudes to each other to determine the distortion level,
   determine the correction coefficient based on the distortion level, and
   provide the correction coefficient to said circuit means.

8. The apparatus according to claim 7 wherein the intermodulation frequency is the third intermodulation frequency.

9. The apparatus according to claim 7 wherein calculating the magnitudes comprises performing a fast fourier transform on the digital samples, and selecting the frequency components corresponding to the pilot tones and the intermodulation frequency of the pilot tones respectively.

10. The apparatus according to claim 7 wherein subsequent to the first correction coefficient being employed to pre-distort said input signal, said processor is programmed to:
    calculate a second magnitude of the sampled output signal at the intermodulation frequency,
    determine a next correction coefficient from said second magnitude, and
    provide the next correction coefficient to said circuit means.

11. The apparatus according to claim 7 wherein the processor determines a second correction coefficient.

12. The apparatus according to claim 2 wherein said circuit means comprises a multiplier having first and second inputs, and an output, the first input receiving said input signal and the second input receiving a portion of the input signal.

13. The apparatus according to claim 12 wherein said portion is determined by said correction coefficient.

14. The apparatus according to claim 12 wherein the multiplier provides an output signal that is non-linear with respect to said input signal.

15. The apparatus according to claim 12 further comprising a controllable attenuator connected between the first and second inputs of said multiplier, said attenuator receiving said correction coefficient as an input and the input signal as its reference signal and providing said portion to the second input.

16. The apparatus according to claim 12 wherein the multiplier provides an output signal, and further comprising bias means coupled to said second input for changing the slope of the output signal.

17. The apparatus according to claim 2 wherein said circuit means comprises:
- a first multiplier having first and second inputs, and an output, said first and second inputs each receiving said input signal,
- a controllable attenuator having a first input connected to the output of said first multiplier, said attenuator having a second input for receiving a first correction coefficient and an output for providing a portion of the signal from the first input of said attenuator at the output thereof,
- a second multiplier having first and second inputs, and an output, said first input of said second multiplier receiving said input signal, and said second input of said second multiplier receiving the output of said attenuator, and
- bias means for providing a dc term at said second input of said second multiplier.

18. The apparatus according to claim 1 wherein said means for generating pilot tones generates at least two pilot tones and wherein the frequencies of each of the pilot tones is substantially lower than the frequency of the signal source.

19. The apparatus according to claim 1 wherein said semiconductor light source means has a non-linear response characteristic wherein pre-distorting said input signal compensates for this non-linearity such that the modulated power output of the light source means varies linearly with the input signal.

20. In an optical communications system, wherein an AC signal source modulates the output of a semiconductor light source and the modulated output signal is transmitted through a fiber optic link to a network, a method for compensating the non-linear response of the semiconductor light source to reduce distortion, comprising:
- injecting pilot tones into the signal source,
- detecting optical outputs resulting from the pilot tones,
- analyzing the optical outputs to determine the distortion in the output of the semiconductor light source as a function of the pilot tones and an intermodulation frequency resulting from the pilot tones, and
- introducing countervailing nonlinearities to pre-distort the AC signal source as a function the non-linear response of the semiconductor light source.

21. In an optical communications system, wherein an AC signal source modulates the output of a light source and the modulated output signal is transmitted through a fiber optic network, an apparatus for compensating the non-linear response of the light source to reduce distortion in the modulated output signal, comprising:
- means for injecting at least two pilot tones into the signal source,
- means for detecting the optical output of said light source resulting from said two pilot tones,
- means for analyzing said optical output to determine the distortion in the output of the light source as a function of the two pilot tones and an intermodulation frequency resulting from the two pilot tones, and
- circuit means responsive to the detected distortion for introducing countervailing nonlinearities to pre-distort the signal source as a function of the nonlinear response of the light source for reducing said distortion in the modulated output signal.

* * * * *

UNITED STATES PATENT AND TRADEMARK OFFICE
CERTIFICATE OF CORRECTION

PATENT NO. : 5,060,310

DATED : October 22, 1991

INVENTOR(S) : Arnold M. Frisch, Thomas A. Almy

It is certified that error appears in the above-identified patent and that said Letters Patent is hereby corrected as shown below:

Col. 13, line 43, "curves" should be "curve".

Signed and Sealed this

Sixth Day of April, 1993

Attest:

STEPHEN G. KUNIN

*Attesting Officer*      Acting Commissioner of Patents and Trademarks